United States Patent
Feiman et al.

(10) Patent No.: US 11,601,462 B2
(45) Date of Patent: *Mar. 7, 2023

(54) SYSTEMS AND METHODS OF INTELLIGENT AND DIRECTED DYNAMIC APPLICATION SECURITY TESTING

(71) Applicant: SYNOPSYS, INC., Mountain View, CA (US)

(72) Inventors: Joseph Feiman, Stamford, CT (US); Eric Sheridan, Greensboro, NC (US); Prabhuram Mohan, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/105,239

(22) Filed: Nov. 25, 2020

(65) Prior Publication Data

US 2021/0084064 A1 Mar. 18, 2021

Related U.S. Application Data

(63) Continuation of application No. 16/891,996, filed on Jun. 3, 2020, now Pat. No. 10,855,717.

(60) Provisional application No. 62/901,083, filed on Sep. 16, 2019.

(51) Int. Cl.
| | |
|---|---|
| *H04L 9/40* | (2022.01) |
| *G06N 3/02* | (2006.01) |
| *G06F 9/54* | (2006.01) |
| *G06F 8/00* | (2018.01) |
| *G06F 11/36* | (2006.01) |
| *G06F 9/445* | (2018.01) |

(52) U.S. Cl.
CPC ............ *H04L 63/1433* (2013.01); *G06F 8/00* (2013.01); *G06F 9/44589* (2013.01); *G06F 9/547* (2013.01); *G06F 11/3664* (2013.01); *G06N 3/02* (2013.01); *H04L 63/1425* (2013.01); *H04L 63/1441* (2013.01); *H04L 63/1475* (2013.01)

(58) Field of Classification Search
CPC ............ H04L 63/1433; H04L 63/1425; H04L 63/1441; H04L 63/1475; G06F 8/00; G06F 9/44589; G06F 9/547; G06F 11/3664; G06F 21/57; G06N 3/02; G06N 3/08

See application file for complete search history.

(56) References Cited

U.S. PATENT DOCUMENTS

| | | | | |
|---|---|---|---|---|
| 2003/0159063 A1* | 8/2003 | Apfelbaum | ............. | H04L 63/14 726/25 |
| 2013/0091578 A1* | 4/2013 | Bisht | ....................... | G06F 21/53 726/25 |
| 2013/0191920 A1* | 7/2013 | Amit | ..................... | G06F 21/552 726/25 |

(Continued)

*Primary Examiner* — Huan V Doan
(74) *Attorney, Agent, or Firm* — Lowenstein Sandler LLP

(57) ABSTRACT

Disclosed are systems, methods and computer readable mediums for intelligent and directed dynamic application security testing. The systems, methods and computer-readable mediums can be configured to receive an attack location and an attack type for a web-application, transmit the attack location and attack type to a ID-DAST platform, receive from the ID-DAST platform a payload, attack the web-application using the payload, and receive results of the attack.

20 Claims, 7 Drawing Sheets

(56) References Cited

U.S. PATENT DOCUMENTS

2014/0082737 A1* 3/2014 Beskrovny .......... H04L 63/1433
                                                    726/25
2015/0096036 A1   4/2015 Beskrovny et al.
2016/0241582 A1*  8/2016 Boia .................... H04L 63/1433
2017/0331847 A1  11/2017 Alexaner et al.
2021/0037040 A1*  2/2021 Aleks ................... H04L 63/205

* cited by examiner

```
{
    "scenarios": [
        {
            "name":  "check-account-balance",
            "steps": [
                {
                    "host":  "127.0.0.1:8080",
                    "protocol":  "http",
                    "method": "GET",
                    "path":  "/account",
                    "headers": {
                        "Content-Type":  "text/html"
                    },
                    "parameters":  {},
                    "expect":  200
                },
                {
                    "host":  "127.0.0.1:8080",
                    "protocol":  "http",
                    "method": "POST",
                    "path":  "/account/balance",
                    "headers": {
                        "Content-Type":  "application/x-www-form-urlencoded"
                    },
                    "parameters": {
                        "account":  "E5001",
                        "lang":  "en"
                    },
                    "expect":  200
                }
            ],
            "payloads": [
                {
                    "attacks":  [ "SQL Injection" ],
                    "steps":  [1]
                }
            ]
        }
    ]
}
```

FIG. 3

SYSTEMS AND METHODS OF INTELLIGENT AND DIRECTED DYNAMIC APPLICATION SECURITY TESTING

The application is a continuation of U.S. patent application Ser. No. 16/891,996, filed Jun. 3, 2020, title "Systems and Methods of Intelligent and Directed Dynamic Application Security Testing", which claims benefit and priority to U.S. provisional patent application No. 62/901,083, filed Sep. 16, 2019, title "Systems and Methods of Intelligent and Directed Dynamic Application Security Testing", the disclosures of which are each hereby incorporated by reference in their entireties.

FIELD OF TECHNOLOGY

The present technology pertains to dynamic application security testing (DAST) and more particularly to intelligent and directed dynamic application security testing. The present technology also pertains to, for example, navigated or guided application security testing.

BACKGROUND

Traditional DAST technology is a process for web-application security analysis that utilizes crawling results to perform test attacks on a given web-application (that is running), analyzing the web-application's reactions to those attacks, and reporting detected web-application vulnerabilities that can potentially be exploited by actual attacks executed by hackers.

Traditional DAST is a process that gathers information and attacks the web-application based on the gathered information. The source of intelligence for traditional DAST technology is crawling. That is, DAST technology crawls a web-application, for example, page-by-page, form-by-form, and/or link-by-link. The results of the crawl are used to discover potentially vulnerable locations which should be attacked (e.g., during testing) in order to validate whether the locations are vulnerable to the actual attacks by hackers. The results of the crawl can also be used to determine the type of the test attacks and the payload (e.g. format and parameters) for the test attacks.

The major challenge of crawling is its time-consuming nature and lack of insight into the web-application that is being tested. In order to discover a potential attack location and type, DAST crawls the web-application (e.g., page-by-page, form-by form, link-by-link) which is an extremely time-consuming process. This time-consuming nature of traditional DAST is exacerbated by the lack of insight into the application. To compensate for that lack of insight, DAST launches an excessive number of time-consuming attacks with the expectation that at least one or a few of them will find exploits. The time-consuming nature of this process and lack of application insight prohibits traditional DAST from being effectively utilized while applications are actively being developed. This process therefore prohibits traditional DAST from being effectively employed during the application development process.

Static Application Security Testing (SAST) technology scans and analyzes the source code, bytecode or binary code to find vulnerabilities inside of the code. SAST is also a time-consuming process because the entire code is scanned and analyzed to determine potential vulnerabilities. Furthermore, the vulnerabilities reported by SAST require further research to determine if they are indeed exploitable at runtime.

Interactive Application Security Testing (IAST) technology utilizes an agent to provide security analysis on an application. IAST combines features of SAST and DAST technologies to determine vulnerabilities in an application. IAST technology has several challenges, including: IAST agent's instrumentation into the application runtime environment (e.g., into Java Virtual Machine (JVM)) concerns application users/enterprises, as it can negatively impact application stability, including a collapse of the application; IAST is language-dependent (e.g., IAST requires a separate agent for each programming language's analysis); and IAST is processor-consuming (e.g., IAST uses the same processor that runs the application), which can impact application behavior.

SUMMARY OF THE INVENTION

Disclosed are systems, methods and non-transitory computer-readable mediums for intelligent and directed dynamic application security testing. The systems, methods and non-transitory computer-readable mediums can be configured to receive an attack location and an attack type for a web-application, transmit to a ID-DAST platform the attack location and attack type, receive from the ID-DAST platform a payload, attack the web-application using the payload, and receive results of the attack.

In some instances, the attack location and the attack type can be determined by automated analysis of a trace of APIs detected, for example, by monitoring the execution of the application tested for the quality assurance (QA) purpose. In some instances, the attack location and the attack type can be automatically determined based on an analysis of the code of the web-application as it is being written/modified by the developer. In some instances, the attack location and the attack type can be provided by at least one of: a developer, static application security testing, and security analytics/statistics (e.g., Open Web Application Security Project Top 10, etc.).

In some instances, the ID-DAST platform can be configured to exercise historical attack scenarios for web-applications. In some instances, the historical attack scenario includes at least a sequence of steps required before submitting the attack payload. Historical attack scenarios can then be saved to a file, database, etc. and then re-used to perform automated security testing.

The vulnerabilities, in some instances, can also be automatically verified (e.g., by a neural network, etc.) The systems, methods and non-transitory computer-readable medium can also be configured to transmit the results of the attack to a neural network, and receive verification the attack was successful. In some instances, the neural network uses historical request and response pairs for the verification.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example attack configuration file in accordance with an embodiment;

DETAILED DESCRIPTION

Figure 1A:
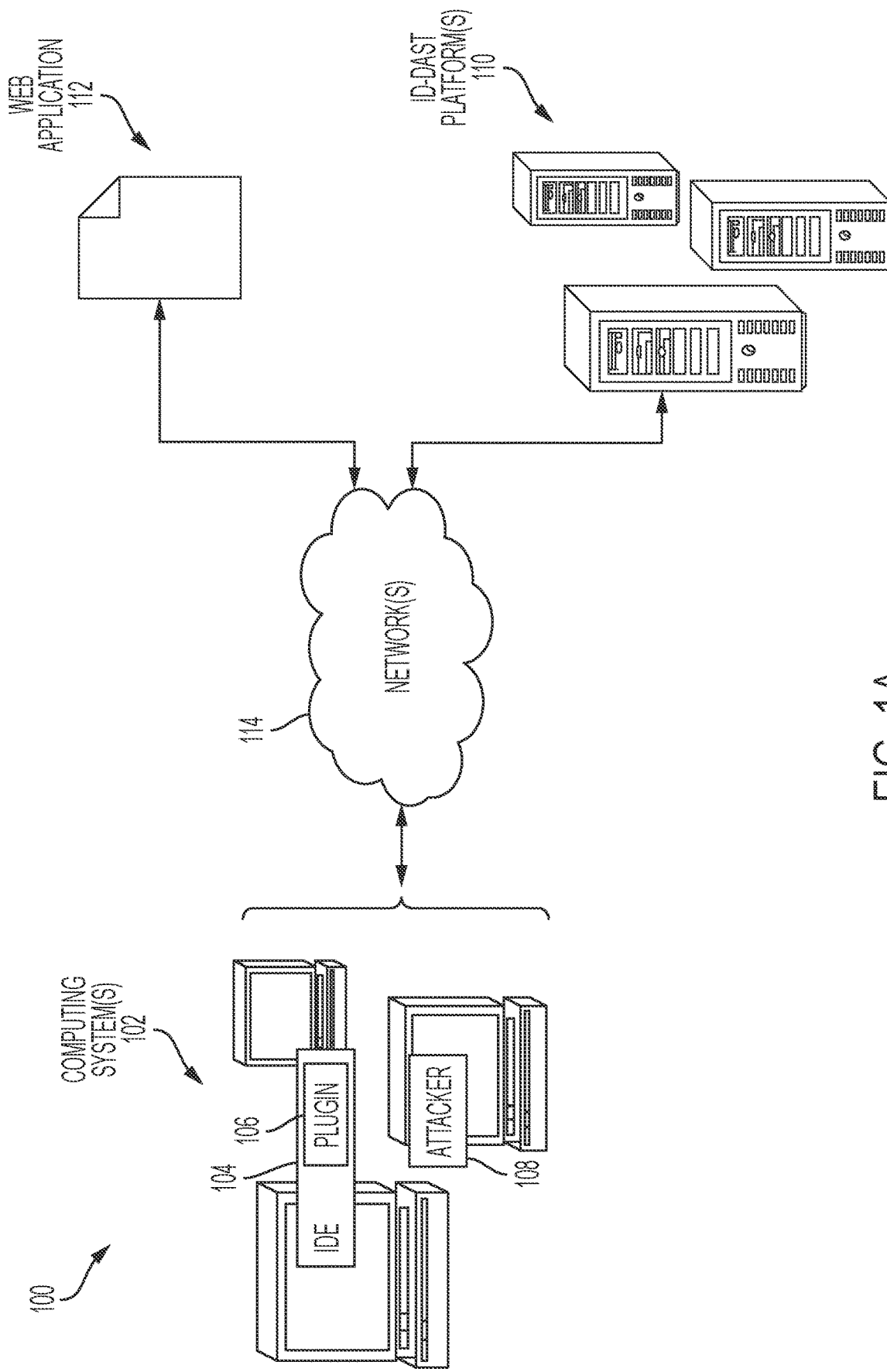
FIG. 1A illustrates an example environment of intelligent and directed dynamic application security testing in accordance with an embodiment.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Techniques described and suggested herein include methods, systems and processes to perform intelligent and directed dynamic application security testing (ID-DAST). Currently, DAST is a slow and cumbersome process which includes two phases: a crawling phase and an attack phase. At the crawling phase, DAST crawls through the web application (pages, links, forms, etc.), which is a time-consuming and intensive process. The crawl results are provided to an attacker, which uses the crawling results to perform multiple tests and in some instances, tests on portions of the application that do not contain vulnerabilities (e.g., not needed). In addition, DAST may test the application for vulnerabilities specific to various vendor/technology stacks (e.g. various databases), while the application uses just one particular vendor/technology stack (e.g. just one particular database) and requires testing only for vulnerabilities related to that specific vendor/technology stack (e.g. database), thus making all other tests redundant and time-consuming.

ID-DAST, however, removes this time-consuming and cumbersome process by eliminating the crawling phase and instead relying on specific testing information provided, for example, automatically, by a trace of APIs detected by monitoring the execution of the application that undergoes QA test. In some other instances, the testing information can be provided, for example, automatically based on a changing application features/functionality (e.g., changes to the code base, etc.). In other instances, the testing information can be provided by other analyses (e.g., SAST, etc.) or a developer. By eliminating the crawling phase, and instead relying on other sources of intelligence, ID-DAST can determine specific attacks to perform in a condensed and efficient manner, improving the dynamic application security testing process, while removing the unnecessary aspects of the process (i.e., reducing scope of tests performed based on provided intelligence (such as knowledge of executed API trace or source code)).

DESCRIPTION

Figure 1B:
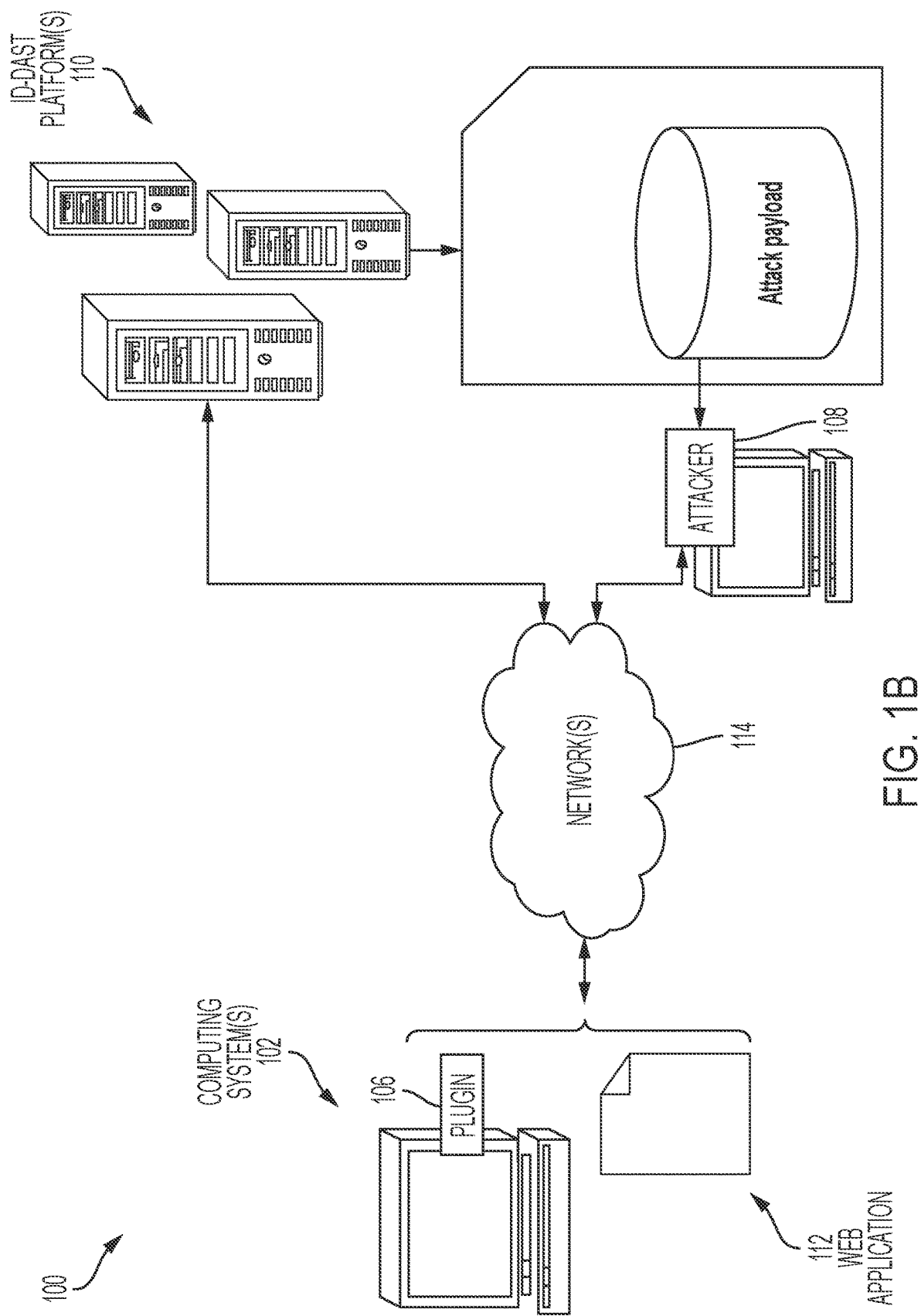
FIG. 1B illustrates an example environment of intelligent and directed dynamic application security testing in accordance with an embodiment.
Figure 2:
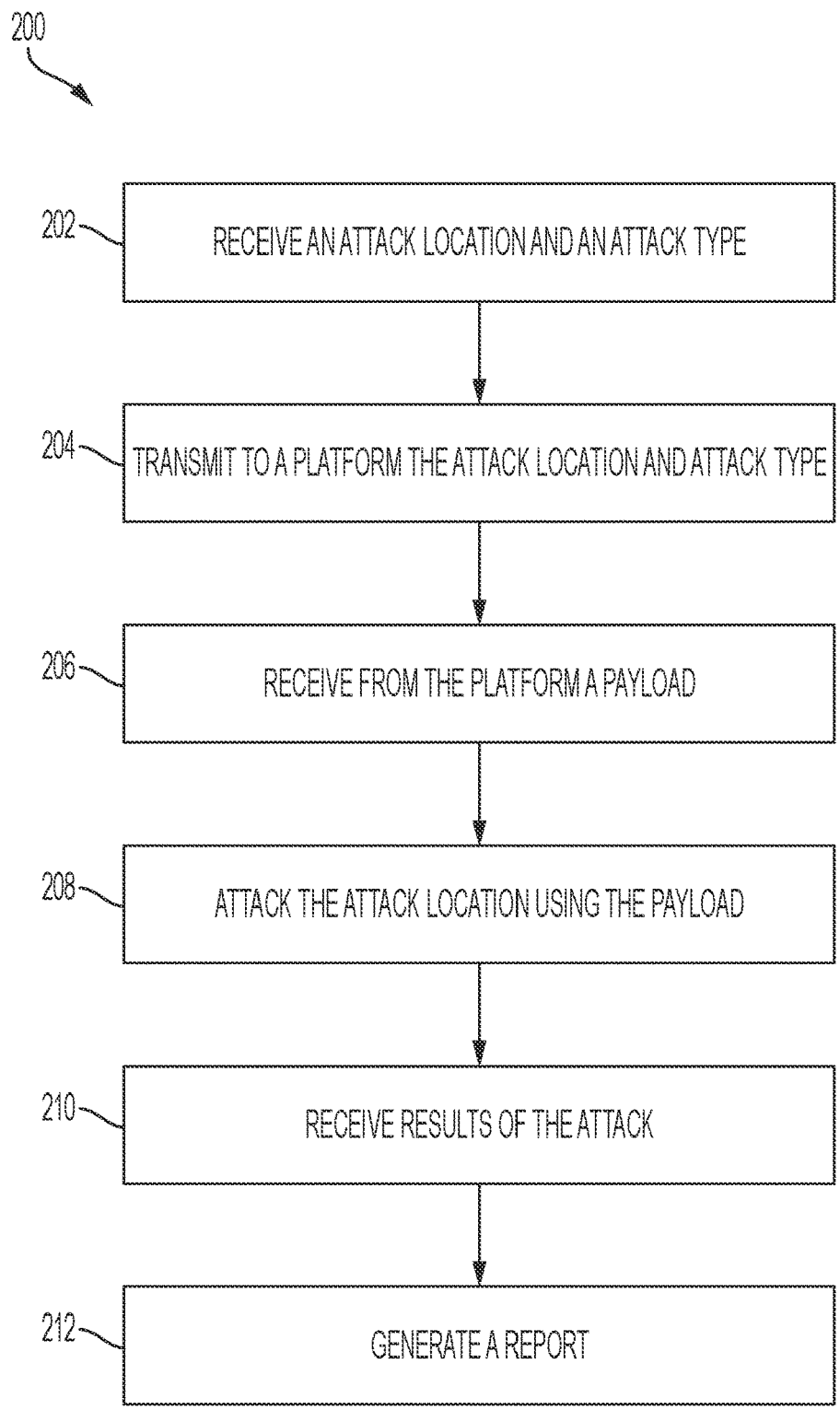
FIG. 2 illustrates a flow chart of an example method of intelligent and directed dynamic application security testing in accordance with an embodiment.
Figure 4A:
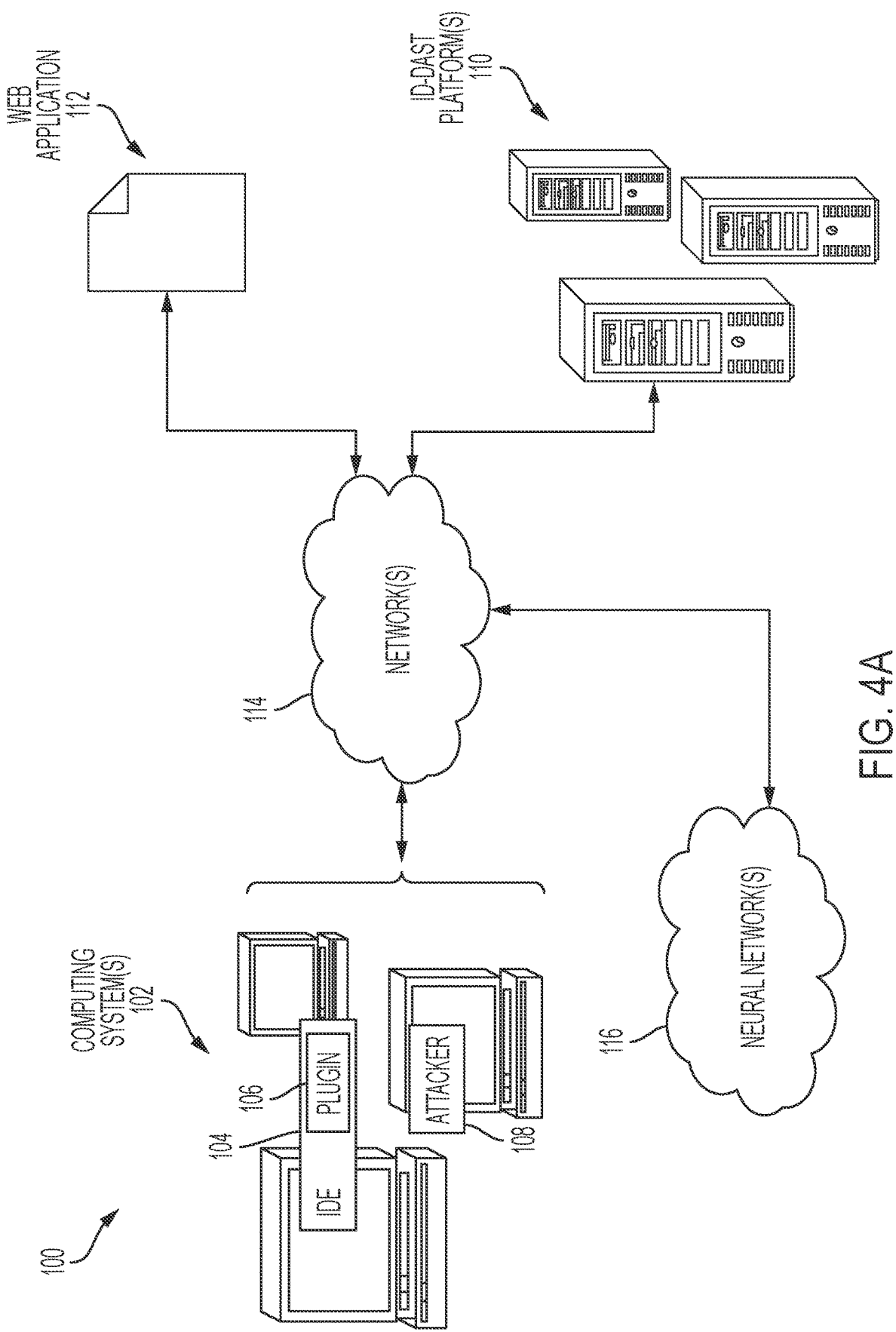
FIG. 4A illustrates an example machine learning environment of intelligent and directed dynamic application security testing in accordance with an embodiment.
Figure 4B:
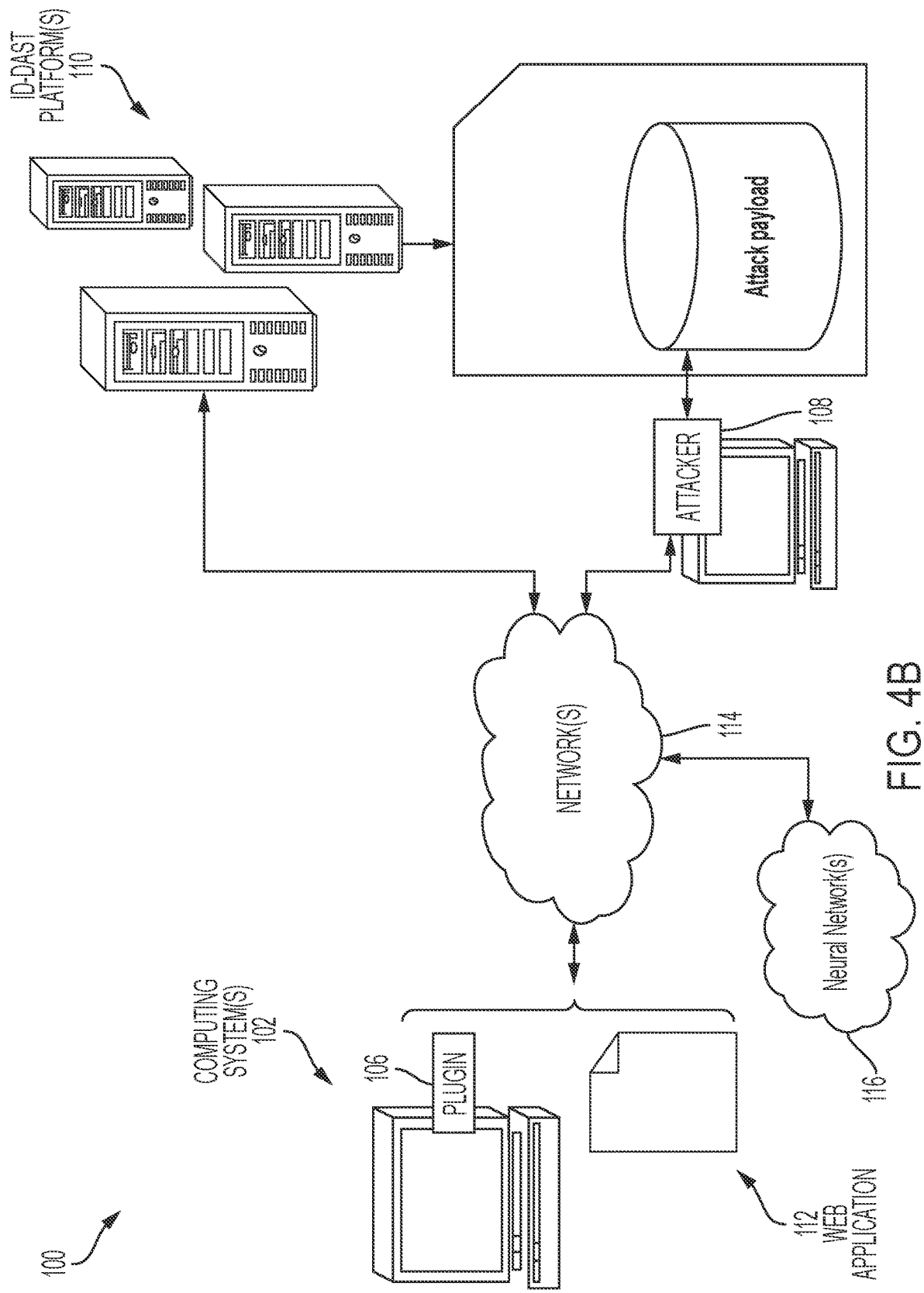
FIG. 4B illustrates an example machine learning environment of intelligent and directed dynamic application security testing in accordance with an embodiment.
Figure 5:
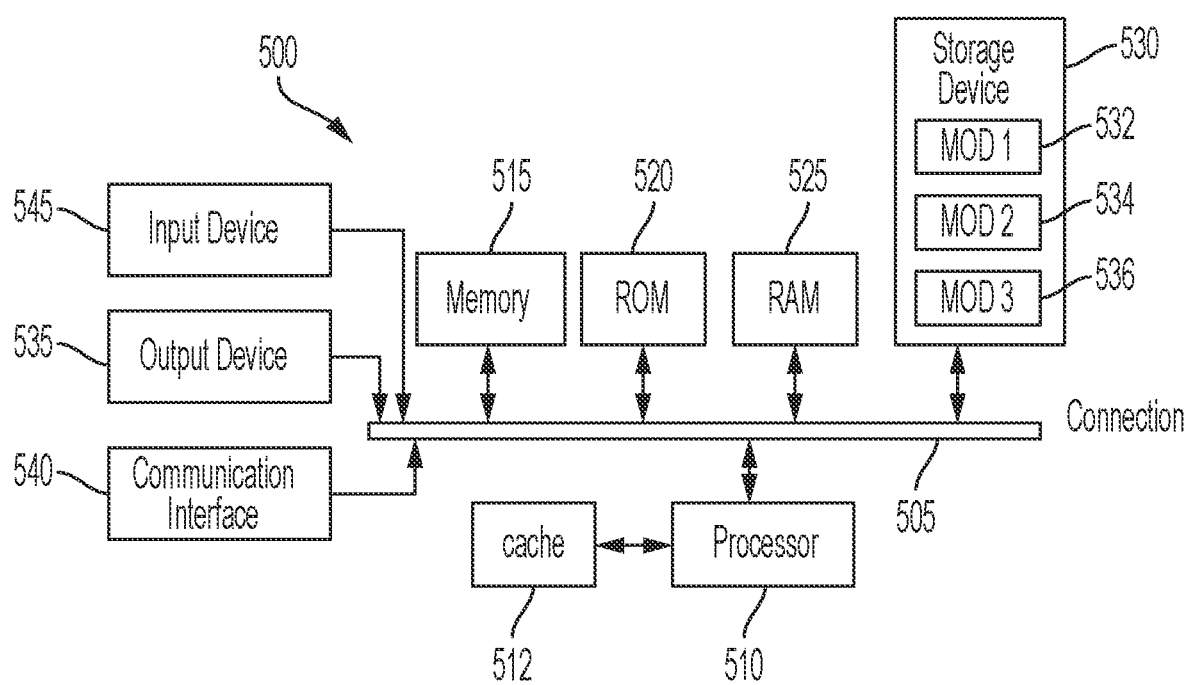
FIG. 5 illustrates an example system in which various embodiments can be implemented.

The disclosed technology addresses the need in the art for improved dynamic application security testing. Disclosed are systems, methods, and computer-readable storage media for attacking and verifying vulnerabilities using intelligent and directed dynamic application security testing. A description of an example environment, as illustrated in FIG. 1A, is first disclosed herein. A description of another example environment, as illustrated in FIG. 1B, is next disclosed herein. A discussion of example processes for intelligent and directed dynamic application security testing as illustrated in FIG. 2 will then follow. A discussion of example attack configuration file as illustrated in FIG. 3 will then follow. A discussion of an example machine learning environment and corresponding processes as illustrated in FIG. 4A will then follow. A discussion of another example machine learning environment and corresponding processes as illustrated in FIG. 4B will then follow. The discussion then concludes with a description of example devices, as illustrated in FIG. 5. These variations shall be described herein as the various embodiments are set forth. The disclosure now turns to FIG. 1A.

FIG. 1A shows an example intelligent and directed dynamic application security testing (ID-DAST) environment 100. Environment 100 can include one or more computing systems 102. Computing systems 102 can run one or more integrated development environments (IDE) 104. IDE 104 can include a source code editor, build automation tools, compiler, version controller, a debugger, plugin application 106 and attacker 108. In some instances, the plugin application and attacker can be independent of the IDE (e.g., the plugin application could reside on a build server, while attacker could reside on ID-DAST platform). Computing systems 102 can communicate with ID-DAST platform 110 and web application 112 via network(s) 114. Network(s) 114 can be any type of computer network or data link capable of transmitting and receiving data packets between Computing system 102 and ID-DAST platform 110 and web application 112. For example, network(s) 114 can be a local area network, wide area network, wired network, wireless network, short range wireless network, the Internet, etc. In some example, computing system 102 can be connected locally (or hardwired) to either or both of ID-DAST platform 110 and web application 112. For example, web application 112 and ID-DAST platform can be hosted on computer systems 102.

ID-DAST platform 110 can be one or more computing systems and databases configured to store and organize results data from historical system attacks. These historical system attacks (e.g., attack scenarios) can be captured, for example, by using JSON configuration files. The configuration files can be developed by a developer, can be auto-generated via IDE plugin, or via SAST scanning technologies.

ID-DAST platform 110 can receive from plugin 106 a proposed attack location (e.g., uniform resource locator) and an attack type (e.g. SQL Injection (SQLi), Cross-Site Scripting (CSS), sensitive data exposure, etc.). The ID-DAST platform can analyze the received data and determine, based on the historical attack data, what type attack payload would be best suited for testing the proposed attack target, for example as shown in FIG. 3. The ID-DAST platform can then send a payload (e.g., a sequence of steps to carry out an attack scenario selected out of the stored attack scenarios). In a not limiting example of a payload, an example payload for a SQL injection, for example, on a first class of vulnerabilities that are being testing can be: ' or 'a'='a. The proposed attack location can be, typically, an API of the web application or its graphical user interface (GUI). As such, ID-DAST, through its plugin, can detect an application's APIs, which are then being tested by the attacker, thus fulfilling so called "API Testing". Accordingly, ID DAST is capable of testing web application GUI as well as its APIs.

The attacker, upon receiving a payload from the ID DAST platform, can launch an attack against a web application. The attacker will collect data about results of the attack and pass it to ID DAST Platform for reporting and, possibly, for verification.

In some instances, the ID-DAST platform can perform basic heuristics to determine if a vulnerability was found (e.g., examining a test response to determine if any error code or codes indicate a vulnerability is present). In some instances, the ID-DAST platform can pass collected information (e.g., attack class, attack location, attack payload, attack request, attack response, etc.) to an existing machine learning implementation for verification.

Web application 112 can be, in some examples, the unit-build or master build that are in development. The master build includes the source code of the individual unit-builds created and/or edited by one or more software developers in, for example, an IDE. In some instances, potential vulnerabilities can be detected at the "Programming" phase of the Software LifeCycle (SLC), within the unit of the code that is programmed in IDE, or at the "Build" phase of the SLC, in a Build server, which Build integrates units of the code programmed by the developer(s). ID-DAST can enable testing in "Development" and "Build" phases of the SLC. For example, testing in the "Build" phases can be performed via attack scenarios as described above. Plugin application 106 can work in combination with attacker 108 to monitor, analyze and test source code written within IDE 104.

In one example, plugin application 106 can be installed in an integrated development environment (IDE). The plugin application can monitor changes in the source code (e.g., via a representation of the source code). For example, when a developer writes new source code or modifies existing source code in the IDE, the plugin application can monitor the changes that are made. When the plugin application determines change(s) are made, the plugin application can analyze the changes to determine what type(s) of change(s) are made, for example, but not limited to changes in: HTTP protocols (headers, parameters, HTTP content type), interaction with database, interaction with file system, URL, parameters, network traffic for attack, etc. Based upon the analysis of the changes by the plugin application, the plugin application can suggest one or more attacks to test the changes. If the plugin application cannot determine the type(s) of change(s), a standard set of attacks can be used (e.g., OWASP Top 10 attacks, etc.). The one or more attacks and locations can then be provided to an attacker (e.g., 108) for carrying out the one or more attacks at the locations. In some examples, the plugin application can operate on multiple programming languages, identify more potential vulnerabilities based on the detected changes, and extend the realm of the attacks by proposing one or more alternative attacks.

In another example, a static code analysis (e.g. SAST) could have been performed on the source code of the master build of a web application and would have located one or more vulnerabilities. These vulnerabilities can collect the same or similar data or information as described in the preceding paragraph. The one or more vulnerabilities and associated data or information can be fed to the ID-DAST platform to determine a payload to simulate one or more attacks on the master build. Since there are specific vulnerabilities that were identified, those specific vulnerabilities are specifically tested. In other instances, the static code analysis can describe where to attack, along with specific vulnerabilities to test. The ID-DAST platform can validate the exploitability of static code analysis vulnerabilities in an automated fashion.

In other examples, the most popular attacks can be performed on the unit and master builds. For example, the ten (10) most popular attacks can be, for example, determined by the Open Web Application Security Project. In some examples, the vulnerabilities targeted can be the vulnerabilities most frequently found and or exploited based on historical data, annual security reports by security companies, or the annual data breach reports. In some examples, specific classes of vulnerabilities can be targeted, for example: configuration file attack, form attack, database attack (e.g., SQL Injection, etc.), XML External Entities (XXE), Directory Traversal, Cross-Site Scripting, Insecure Deserialization, HTTP Header Injection, OS Command Injection, Cross-Site Request Forgery, etc. In another example, attack scenarios used for testing vulnerabilities in one or more individual IDEs by one or many developers can be collected together and then used to test an entire master build.

FIG. 1B shows another example intelligent and directed dynamic application security testing (ID-DAST) environment 100 employing API tracing as a source of intelligence for its testing. Similar to FIG. 1A, the example shown in FIG. 1B illustrates environment 100 which includes one or more computing systems 102. Computing systems 102 can run one or more web applications (or microservices) 112, which undergo a test, e.g. a QA test. Web application (or microservice) 112 can be integrated with ID DAST plugin application 106, which dynamically captures API trace (for example, produced by analysis of the running application that is undergoing a QA test), and sends it to the ID DAST Platform 110. Computing systems 102 can communicate with ID-DAST platform 110 via network(s) 114. As discussed above with respect to FIG. 1A, network(s) 114 can be any type of computer network or data link capable of transmitting and receiving data packets between computing system 102 and ID-DAST platform 110. For example, network(s) 114 can be a local area network, wide area network, wired network, wireless network, short range wireless network, the Internet, etc. In some example, computing system 102 can be connected locally (or hardwired) to ID-DAST platform 110.

In the embodiment illustrated in FIG. 1B, ID-DAST platform 110 stores and organize results data from historical system attacks. These historical system attacks (e.g., attack scenarios) can be captured, for example, by using JSON configuration files. In this embodiment, the configuration files can be developed by a developer, can be autogenerated via IDE plugin, can be autogenerated via technologies that monitor network traffic to produce an API trace, or via SAST scanning technologies.

ID-DAST platform 110 illustrated in FIG. 1B can receive from ID-DAST Plugin 106 for example, a proposed attack location (e.g., uniform resource locator, as well as a method, parameters, and content-type of a network protocol) and an attack type (e.g. SQL Injection (SQLi), Cross-Site Scripting (CSS), sensitive data exposure, etc.). The ID-DAST platform can analyze the received data and determine, based on the historical attack data, what type attack payload would be best suited for testing the proposed attack target, for example as shown in FIG. 3. The ID-DAST platform can then send a payload (e.g., a sequence of steps to carry out an attack scenario selected out of the attack scenarios) to an Attacker 108. In a non-limiting example of a payload, an example payload for a SQL injection, for example, on a first class of vulnerabilities that are being testing can be: ' or 'a'='a. The proposed attack location can be, typically, an API of the web application or the microservice. As such, ID-DAST, through its Plugin can automatically detect and then, through its Attacker test for security an application APIs or its GUI, thus fulfilling so called "API Testing". Accordingly, ID-DAST is capable of testing web application with its GUI as well as its APIs.

ID DAST does not require any preliminary, pre-application-runtime declaration of APIs by any party (e.g., a developer) or a technology involved in application development, operation or security. API detection takes places via its plugin (e.g., Plugin 106). It happens at application-runtime automatically, thus making a preliminary API declaration unnecessary. Moreover, a declaration made before application-runtime, can easily be inaccurate. For example, it can miss, conceal or misrepresent some API(s), or declare API(s) in a format that violates some established API-declaration standard(s). On the contrary, ID-DAST tests "real APIs", i.e., APIs actually executed by the tested application, thus assuring API testing accuracy and coverage. The attacker, in a similar manner described above, upon receiving a payload from the ID-DAST platform, can launch an attack against a web application/microservice. The attacker will collect data about results of the attack and pass it to ID DAST Platform for verification.

Like the first embodiment, the ID-DAST platform can perform basic heuristics to determine if a vulnerability was found (e.g., examining a test response to determine if any error code or codes indicative of a vulnerability is present). In some instances, the ID-DAST platform can pass collected information (e.g., attack class, attack location, attack payload, attack request, attack response, etc.) to an existing machine learning implementation for verification.

In the embodiment illustrated in FIG. 1B, web application (or a microservice) 112 can be, in some instances, an individual unit-build created by an individual developer. In some instances, web application (or a microservice) 112 can be a master build that includes unit-builds created by a team of multiple individual developers. There are different ways of detecting vulnerabilities in the web application (or microservice) 112. For example, vulnerabilities in the unit-build and/or master-build can be determined by analysis of a trace of APIs (e.g., a trace of APIs detected by monitoring the execution of the tested application that undergoes a QA test) and then attacking the application with attack payloads. In some instances, potential vulnerabilities can be detected at the "Programming" phase of the Software LifeCycle (SLC), within the unit of the code or unit of the build that is developed by an individual developer, or at the "Build" phase of the SLC, in a Build server, which Build integrates units of the builds developed by the individual developer(s). ID-DAST can enable testing at "Development" and "Build" phases of the SLC. For example, testing in the "Build" phases can be performed via attack scenarios as described above. Plugin application 106 can work in combination with attacker 108 to monitor, analyze and test the web application (or microservice) 112.

In one example, a Plugin 106 is constructed as a listener of network traffic (e.g., HTTP), which analyzes in-coming and outgoing network requests and responses. ID-DAST analyzes that traffic and detects trace of APIs. Upon APIs detection, in order to see if the APIs are vulnerable to attacks, ID-DAST either attacks those APIs in real time or records those API for later API testing. Such API testing can be done for individual unit-build (e.g. at Programming phases of software life cycle (SLC)) or for testing an entire application's master-build (at Build phase of SLC).

Turning now to FIG. 2, which shows a flow chart of an example method for performing an ID-DAST attack. Method 200 shown in FIG. 2 is provided by way of example, as there are a variety of ways to carry out the method. Additionally, while the example method is illustrated with a particular order of blocks, those of ordinary skill in the art will appreciate that FIG. 2 and the blocks illustrated therein can be executed in any order that accomplishes the technical advantages of the present disclosure and can include fewer or more steps than illustrated.

Each block shown in FIG. 2 represents one or more processes, methods, or subroutines, carried out in example method. The blocks illustrated in FIG. 2 can at least be implemented in the environments illustrated in FIGS. 1A and 1B. Additional steps or fewer blocks are possible to complete the example method. Each block shown in FIG. 2 can be carried out by at least one or more of the systems illustrated in FIGS. 1A and 1B.

Method 200 can begin at block 202. At block 202, a computing system (e.g., 102) can receive an attack location and an attack type. The attack location and attack type can be identified and sent, for example, automatically, by a detected API trace; by a developer; by SAST; by a plugin into application's code, IDE or a runtime environment; by analytics/risk statistics; by artificial intelligence analysis (e.g., neural network), etc. All of these entities can have insight into where, what and why an attack should take place. In some examples, the insight can be provided by various sources, for example, by analysis of an API trace detected via monitoring the execution of the tested application; by code analysis via the plugin; by static application security testing; by developers, etc. For example, a developer could be working on a new module and can provide details of that module and a specific type of attack to test if the new module has vulnerabilities before it is committed to the unit or master builds.

The attack location can be, for example, a uniform resource locator, a portion of source code, a module in a build, etc. The attack type can be based on the underlying source code analysis. For example, the attack type can be SQL Injection, XML External Entities (XXE), Directory Traversal, Cross-Site Scripting, Insecure Deserialization, HTTP Header Injection, OS Command Injection, Cross-Site Request Forgery, etc. The attack types can also be, for example, a configuration file attack, form attack, database attack, etc.

At block 204, the computing system transmits the attack location and attack type to an ID-DAST platform (e.g., 110).

The ID-DAST platform can include historical information on attacks that have been previously performed. The historical information can include attack type, results, vulnerability, identifier, verification, remediation options, relationship to other vulnerabilities, etc. The historical information can be used to create attack payloads (e.g., a sequence of steps to carry out a selected attack scenario), as shown in FIG. 3. Those attack payloads can be stored in the attack payload database on ID-DAST platform. Upon receiving the attack location and attack type, the ID-DAST platform can analyze the received information and determine a payload. In a non-limiting SQL injection example, the plugin application can notice changes to an application (e.g., source code) and suggest attack payloads for SQL Injection attacks. The plugin application can detect that the "Postgresql" database is used and provide this information to the ID-DAST platform. In turn, the ID-DAST Platform can use the suggested SQL Injection attack and information about the use of Postgresql, and query one or more attack payload database for relevant attack payloads. Payloads can be associated with an attack class (i.e. SQL Injection) and tags (ex: database:postgresql) enabling querying of the one or more databases. In some instances, the payload can include a sequence of steps to carry out a selected attack scenario (of the historical attack scenarios). In other instances, the payload can include a combination of historical attack scenarios.

At block 206, the computing system (e.g., 102) can receive the payload. Upon receiving the payload, the computing system can send or enable access of the payload to the attacker (e.g., 108). In some examples, the attacker can get the target web application/microservice into a desired state before submitting the attack (e.g., by submitting one or more commands to the web application). In some examples, the attacker can perform a login step before submitting the actual attack, to enable access to the target functionality. At block 208, the attacker can attack the attack location using the payload. For example, the attacker can send a specific SQL Injections (e.g., payload as described above) to test a specific type of vulnerabilities at the attack location (e.g. identified by a uniform resource locator.

At block 210, the attacker (e.g., 108) can receive results of the attack. The results can include, for example, an SQL response. Upon receiving the results, the attacker (or other components of the computing systems) can use heuristics based on the attack class and attack type to determine whether the attack was successful, for example, an attack may be deemed successful if the web application produces a certain error code or set of error codes in response to the attack. In other examples, the results can be sent for verification to a machine learning implementation as described below. In some examples, the attack (e.g., payload, location, attack type) and the results can be transmitted to a machine learning implementation, for example, a neural network, to verify the vulnerability as discussed below.

At block 212, the attacker or computing system (e.g., 102) can generate a report with results of the attack. For example, the report can include a line number and source file of where the vulnerabilities were located. In some examples, the report can include the line of code, where the vulnerability is detected; the type of the vulnerability; the explanation of what the vulnerability means; and advice how to fix the vulnerability.

Turning now to FIGS. 4A and 4B, which show example ID-DAST environments 100 with a neural network 116. The neural network 116 can be, but is not limited to convolutional neural network (e.g., character-based, etc.), recurrent neural networks (e.g., long short term memory, etc.), etc. The convolutional neural networks (CNN) can classify the input text utilizing parameters such as length of the input array of numbers, vocabulary and convolutional filter configuration to enable vulnerability detection and verification. CNNs can be directly applied to distributed or discrete embedding of words, without any knowledge on the syntactic or semantic structures of a language. CNNs can also use character-level features for language processing, for example, using character-level n-grams with linear classifiers and incorporating character-level features to CNNs. In particular, these approaches use words as a basis, in which character-level features extracted at word or word n-gram level form a distributed representation. The long short term memory networks (LSTMN) can classify, process and predict time series given time lags of unknown size and duration between important events (e.g., vulnerabilities, etc.). LSTMNs are popular in processing Natural Language Processing (NLP) tasks because of its recurrent structure, that is very suitable to process variable-length text, for example, distributed representations of words by first converting the tokens comprising each text into vectors, which form a matrix that can include two dimensions: the time-step dimension and the feature vector dimension.

After attacker 108 receives results from either the web application (or microservice) 112 (e.g., HTTP response), the attacker can transmit the results to a neural network 416, for example, via network 114. Neural network 116 can receive the results (e.g., HTTP request/response) and can verify whether or not the results of the attack are a vulnerability or a false positive. The neural network can then return to the attacker results of the verification.

In some instances, neural network 116 can be multiple neural networks, each being specifically trained for different classes of vulnerabilities. In these instances, when the results (e.g., HTTP request/response) are received a classification is first determined in order to determine the appropriate neural network to perform the verification. In other examples, the attacker can send classification data with the results.

The neural network can be trained by ID-DAST platform 110. ID-DAST platform 110 can include historical data sets, for example, attack results (e.g., HTTP requests/responses) from one or more web applications over a period of time (e.g., as described in FIGS. 1A and 1B). The historical data sets can also include the vulnerability, identifier, verification, remediation options, relationship to other vulnerabilities, etc. The historical data sets can be continuously updated with each attack. The historical data sets can be used to create attack files as shown in FIG. 3. The vulnerabilities detected (e.g., historically) can be stored in the data store, along with associated metadata. Each vulnerability can have an identifier. The identifier can be unique to the vulnerability. The corresponding metadata can also be used in identifying the potential vulnerability. When the vulnerability is being stored in the data store, the data store can determine if the vulnerability has been previously identified (via the identifier). If the vulnerability has previously been identified, the data store can determine if verification options and remediation options that corresponding to the potential vulnerability are stored at the data store. When verifications and remediation options that correspond to the potential vulnerability exist, during the store operation the verification options and remediation options can be associated with the newly stored potential vulnerability and the associated metadata. When verifications and remediation options do not exist, a notification can be set to the operator for further manual investigation. Subsequent, the vulnerability and associated data can be stored. In some examples, the verifications can determine the potential vulnerability is not a vulnerability, for example a false positive. These vulnerabilities can be classified, and each or a subset of these vulnerabilities can be used to train one or more neural networks. The training, using the classified vulnerabilities, can create specialized neural networks that are intelligent in verifying potential vulnerabilities based on the available historical vulnerabilities and the associated data of those vulnerabilities.

The neural network, once trained, can be used to analyze the results of attacks. For example, when an attack is performed (as discussed in FIGS. 1A and 1B) the attack (e.g., HTTP request) and the results of the attack (e.g., HTTP response) can be used as input into the trained neural network. The trained neural network can then determine if the attack resulted in a vulnerability, no vulnerability or a false positive. If the attack resulted in a vulnerability, the vulnerability and corresponding information can be provided in a report, as discussed above. If the attack resulted in a vulnerability or a false positive the neural network can utilize that information for further training.

FIG. 5 shows an example of computing system 500 in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

The various embodiments further can be implemented in a wide variety of operating environments, which in some cases can include one or more user computers, computing devices or processing devices, which can be used to operate any of a number of applications. User or client devices can include any of a number of general-purpose personal computers, such as desktop, laptop or tablet computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network. These devices can also include virtual devices such as virtual machines, hypervisors and other virtual devices capable of communicating via a network.

Various embodiments of the present disclosure can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of servers or mid-tier applications, including Hypertext Transfer Protocol ("HTTP") servers, Hypertext Transfer Protocol Secure ("HTTPS") servers, Transport Layer Security ("TLS") servers, SPDY™ servers, File Transfer Protocol ("FTP") servers, Common Gateway Interface ("CGI") servers, data servers, Java servers, Apache servers, Internet Information Services ("IIS") servers, Zeus servers, Nginx servers, lighttpd servers, proxy servers (e.g., F5®, Squid, etc.), business application servers, and other servers (e.g., Incapsula™, CloudFlare®, DOSarrest, Akamai®, etc.). The server(s) can also be capable of executing programs or scripts in response to requests from user devices, such as by executing one or more web applications that can be implemented as one or more scripts or programs written in any programming language, such as Java®, C, C# or C++, or any scripting language, such as Ruby, PHP, Perl, Python®, JavaScript®, or TCL, as well as combinations thereof. The server(s) can also include database servers, including without limitation those commercially available from Oracle®, Microsoft®, Sybase®, and IBM® as well as open-source servers such as MySQL, NoSQL, Hadoop, Postgres, SQLite, MongoDB, and any other server capable of storing, retrieving, and accessing structured or unstructured data. Database servers can include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system can also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets) or both. Further, connection to other computing devices such as network input/output devices can be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., can be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. The code can be stored on a computer-readable storage medium, for example, in the form of a computer program comprising a plurality of instructions executable by one or more processors. The computer-readable storage medium can be non-transitory (referred to herein as a "non-transitory computer-readable storage medium") and/or can be tangible (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments can become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for intelligent directed dynamic application security testing, the system comprising:
   a processor; and
   a computer-readable medium storing instructions, which when executed by the processor causes the processor to:
   receive an attack scenario for at least one of a web-application or a microservice;
   transmit to a platform the attack scenario;
   receive from the platform a payload;
   attack the web-application or the microservice using the payload; and
   receive results of the attack, wherein the attack scenario comprises at least an attack location and an attack type, wherein detection and identification of the attack location and the attack type are provided by a non-crawling source.

2. The system of claim 1, wherein the non-crawling source is at least one of: Application Programming Interface (API) detected via monitoring application traffic, Graphical User Interface (GUI) action detected via monitoring application traffic, static application security testing, analysis of code/build units of the web application or the microservice, analysis of application development, quality assurance, or testing, security analytics and statistics, or historical attack scenarios.

3. The system of claim 1, wherein the detection, identification and testing do not require a pre-application-runtime declaration of Application Programming Interfaces (API).

4. The system of claim 1, wherein Application Programming Interfaces (API) are determined at runtime.

5. The system of claim 1, wherein the web application or the microservice is one of an individual unit-build, a single code unit, a module, one or more Application Programming Interfaces, or a master build.

6. The system of claim 1, where the web application or the microservice is accessed and tested by using login credentials or session-state identifiers.

7. The system of claim 6, wherein the login credentials or session-state identifiers are automatically detected.

8. The system of claim 1, wherein the payload is determined and dynamically constructed, at runtime, based on the platform applying analytics to the attack scenario.

9. The system of claim 1, comprising further instructions, which when executed by the processor causes the processor to:
transmit the results of the attack to a neural network; and
receive verification the attack was successful.

10. The system of claim 9, wherein the neural network uses historical request and response pairs for the verification.

11. A non-transitory computer-readable medium storing instructions, which when executed by at least one processor causes the at least one processor to:
receive an attack scenario for at least one of a web-application or a microservice;
transmit to a platform the attack scenario;
receive from the platform a payload;
attack the web-application or microservice using the payload; and
receive results of the attack, wherein the attack scenario comprises at least an attack location and an attack type, wherein detection and identification of the attack location and the attack type are provided by a non-crawling source.

12. The non-transitory computer-readable medium of claim 11, wherein the detection, identification and testing do not require a pre-application-runtime declaration of Application Programming Interfaces (API).

13. The non-transitory computer-readable medium of claim 11, wherein the payload is determined and dynamically constructed, at runtime, based on the platform applying analytics to the attack scenario.

14. The non-transitory computer-readable medium of claim 11, wherein at least one of the web application or the microservice is one of an individual unit-build, a single code unit, a module, one or more Application Programming Interfaces, or a master build.

15. The non-transitory computer-readable medium of claim 11, wherein the non-crawling source is at least one of: Application Programming Interface (API) detected via monitoring application traffic, Graphical User Interface (GUI) action detected via monitoring application traffic, static application security testing, analysis of code/build units of the web application or the microservice, analysis of application development, quality assurance, or testing, security analytics and statistics, or historical attack scenarios.

16. A method comprising:
receiving an attack scenario for at least one of a web-application or a microservice;
transmitting to a platform the attack scenario;
receiving from the platform a payload;
attacking the web-application or microservice using the payload; and
receiving results of the attack, wherein the attack scenario comprises at least an attack location and an attack type, wherein detection and identification of the attack location and the attack type are provided by a non-crawling source.

17. The method of claim 16, wherein at least one of the web application or the microservice is one of an individual unit-build, a single code unit, a module, one or more Application Programming Interfaces, or a master build.

18. The method of claim 16, where at least one of the web application or the microservice is accessed and tested by using at least one of login credentials or session-state identifiers.

19. The method of claim 18, wherein at least one of the login credentials or session-state identifiers are automatically detected.

20. The method of claim 16, wherein the payload is determined and dynamically constructed, at runtime, based on the platform applying analytics to the attack scenario.

* * * * *